H. B. KEIPER.
BALL AND ROLLER BEARING.
APPLICATION FILED APR. 18, 1910.
997,920.
Patented July 11, 1911.
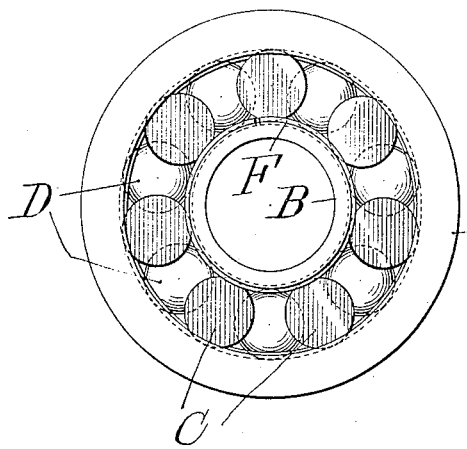
Fig. 1
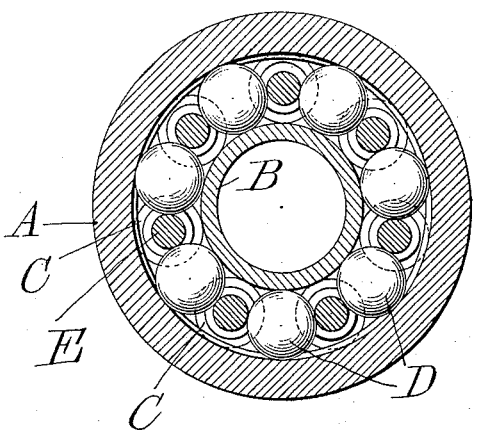
Fig. 2
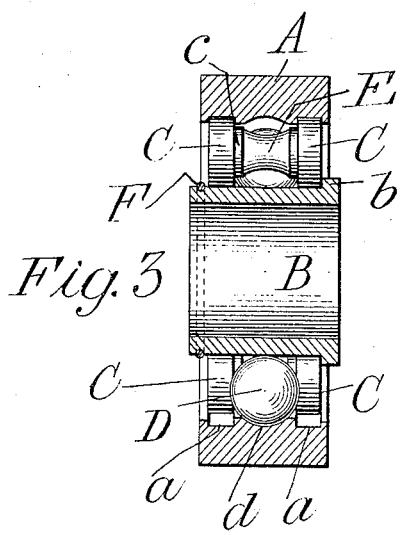
Fig. 3
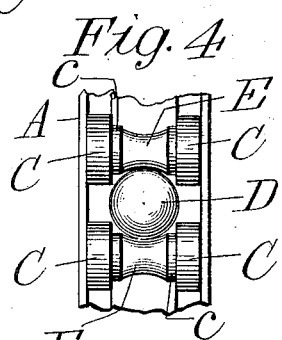
Fig. 4
Fig. 8
Fig. 5
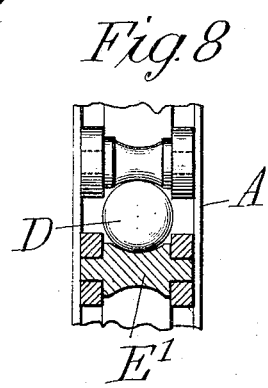
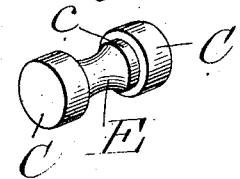
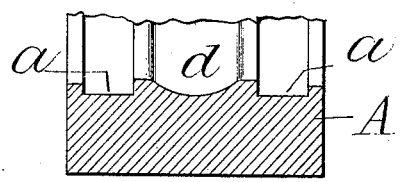
Fig. 6
Fig. 7
Witnesses.
Joseph C. Stack.
Donald H. Stewart.
Inventor
Henry B. Keiper
By Dowell & Dowell
his Attorneys

UNITED STATES PATENT OFFICE.

HENRY B. KEIPER, OF LANCASTER, PENNSYLVANIA.

BALL AND ROLLER BEARING.

997,920. Specification of Letters Patent. Patented July 11, 1911.

Application filed April 13, 1910. Serial No. 556,204.

*To all whom it may concern:*

Be it known that I, HENRY B. KEIPER, a citizen of the United States, residing at Lancaster, in the county of Lancaster and State of Pennsylvania, have invented certain new and useful Improvements in Ball and Roller Bearings, of which the following is a specification.

This invention relates to anti-friction bearings, and more particularly to that type of bearings in which concentric rings are used with interposed balls or rollers for sustaining radial pressure or thrust, and which are known in the art as annular ball bearings.

The primary object of the invention is to provide an improved bearing of the type referred to, in which annular series of balls and rollers are assembled in compact form between concentric rings or bearing members, for sustaining radial pressure, the device being independent of the structure in which it is designed to be used and capable of being handled as a unit without requiring any extraneous separating means to keep the balls and rollers apart; the balls being adapted to serve as separators for the rollers, and vice-versa, thus dispensing with "spacers" or other separating devices, such as are ordinarily employed to separate balls or rollers.

A further object is to produce a device of the character referred to which shall be simple and inexpensive in construction and efficient and durable in practical use.

The invention will first be hereinafter more particularly described, with reference to the accompanying drawings, which are to be taken as a part of this specification, and then pointed out in the claims at the end of the description.

Figure 1 of the drawings represents a side elevation of a ball and roller bearing embodying my invention; Fig. 2 is a vertical sectional elevation of the same; Fig. 3 is a transverse section; Fig. 4 is a detail fragmentary view; Fig. 5 is a perspective view of one of the axially connected or double rollers; Fig. 6 is a detail fragmentary sectional view of a modification of the inner ring or sleeve; Fig. 7 is a detail fragmentary sectional view of a portion of the outer ring. Fig. 8 is a detail fragmentary sectional view of a modified form of bearing, in which the axial connections of the rollers are loose and adapted to serve as idlers for separating the balls.

In said drawings, in which the same reference letters are used to denote corresponding parts in different views, the letter A may denote an outer cylindrical bearing member or ring within which is placed an inner bearing member or sleeve B, and between said members are placed two rows or annular series of rollers C, C, and a single row or annular series of balls D between the two rows of rollers. The rollers are preferably connected in pairs by axial portions E, which may be rigid therewith and concave in form, being joined to annular projections or bosses $c$ on the inner sides of the rollers, so as to provide shoulders of sufficient width to prevent the balls from touching the rollers, while the latter are brought close together with a ball between. The outer ring or bearing member A is formed or provided on its inner side with parallel marginal annular grooves $a$, $a$, forming raceways for the rollers, and with an intermediate annular groove $d$, forming a raceway for the balls between the two rows of rollers, adjacent pairs of which are separated by the balls to prevent contact of their oppositely rotating confronting surfaces. The rollers likewise separate the balls, which fit into the concavities of the axial connections with opposite pairs of which they contact at diametrically opposite points. The inner ring or sleeve B may have at one end an exterior annular flange $b$ and at the other end an annular exterior recess to receive a spring F, which may be "snapped" into said recess, when the sleeve is inserted in the opening encircled by the rollers and balls, to prevent the sleeve from being withdrawn accidentally when the structure is removed from the bearings, the flange $b$ serving to prevent endwise movement in one direction and the spring F preventing endwise movement in the opposite direction.

In Fig. 6 is shown a modified form of sleeve with means to prevent accidental displacement or withdrawal thereof, such means consisting of a slightly raised portion $f$ at the end of the sleeve opposite the flange $b$, the diameter of the sleeve between the part $f$ and the flange $b$, being slightly less than that of said raised portion, so that the sleeve may be inserted by pressure sufficient to force the balls over said portion *f*, by virtue of the resiliency of the metal of which the two rings are composed. If desired, the slightly raised end portion *f* might be in the form of a threaded nut screwed on the sleeve instead of integral therewith.

In Fig. 8 is shown a modification in which the rollers are loose on their axial connections, the latter, which are denoted by the letter E¹ in the drawings, being adapted to rotate either forwardly or backwardly having the function of idlers serving as separators for the balls.

In some cases, it may be desirable to reduce the size of either the ball or roller elements, so that the one or the other may serve solely as separators, in which case the other ball or roller elements would carry the load. The bearing surface of the inner ring or sleeve is plain or smooth, reducing to a minimum the points of contact with the balls and rollers, and the rollers and balls of each row are kept in alinement and adapted to travel in the same track by virtue of the raceways or grooves in the bearing surface of the outer ring, or vice versa. As shown, the bottoms of the marginal grooves *a, a*, are flat, while the intermediate groove *d* is concave, but the form of the groove might be varied, for instance, it might be V-shaped in cross-section, and the peripheries of the rollers might be correspondingly shaped, if desired.

I thus provide a very simple, efficient and durable independent annular ball and roller bearing in which the pressure or weight is distributed between the rollers and balls, and both balls and rollers separated in such manner as to produce the desired results without using "spacers" or other extraneous separating devices, which are usually composed of separable parts secured together by means of screws that are liable to work loose and drop out causing breakage of the balls or the bearing. Such extraneous separating devices also produce much friction and wear. It will also be observed that the assembled parts of the bearing are held together by the coöperative action of the outer and inner rings or bearing members without the use of a screw or bolt, this being accomplished by virtue of the annular grooves in the outer ring with shoulders abutting a circular series of rollers at each side thereof, and means at opposite sides or ends of the inner ring also abutting said circular series of rollers, said means at the same time enabling the inner ring to be withdrawn, whereupon the bearing will fall apart. My improved bearing is capable of sustaining great pressure while greatly reducing friction, the weight of the load being carried or sustained partly by the balls and partly by the rollers at either side, and each ball or roller element serves as a separating means for other ball or roller elements, keeping oppositely rotating surfaces of the balls and rollers apart and thus reducing friction. The balls being centrally disposed, the pressure at either side thereof is taken by the rollers, thus equalizing the pressure between the rollers and balls and providing a very efficient and durable bearing.

It may be desirable in some cases to substitute a third annular series of rollers for the annular series of balls, in which case axial portions of the intermediate series of rollers should project into the spaces between the outer rollers, so as to keep the latter apart and prevent the intermediate rollers from canting. While the intermediate series of balls are designed to sustain pressure and at the same time serve as a means for separating the rollers, in some circumstances they might be of reduced size to adapt them to serve merely as a means for separating adjacent pairs of rollers. In such case, the balls would be loosely confined between adjacent pairs of rollers in contact with their axial connections, which, if rigid, as shown in Figs. 1 to 5 of the drawings, would cause the balls to rotate in a direction opposite to the direction of rotation of the rollers. When the load or pressure is distributed between the rollers and balls, both balls and rollers rotate in the same direction and the points of contact are so slight that there is little friction.

Various changes in details might be made without departing from the spirit and scope of my invention; hence I do not desire to be limited to the particular construction shown, although the forms illustrated are desirable and well adapted to produce the desired results.

Having thus described my invention, what I claim as new and desire to secure by Letters Patent, is:

1. A unit-structure bearing comprising concentric rings having confronting bearing surfaces, rollers arranged in concentric rows between said rings, and a row of balls between said rollers, adjacent pairs of rollers being held apart by a ball, one of said rings having annular parallel grooves in its bearing surface, providing a race-way for one row of rollers at each side, and an intermediate race-way for said row of balls, the other ring having means thereon at opposite ends coöperating with said grooved ring in holding the assembled parts together as a unit.

2. A unit-structure ball and roller bearing comprising concentric rings having confronting bearing surfaces, rollers arranged in concentric rows between said rings, and a row of balls between said rows of rollers, each ball separating adjacent pairs of rollers, the bearing surface of one of said rings having annular parallel grooves therein providing a race-way for one row of rollers at each side of its center, and an intermediate race-way for said row of balls, the other ring having means thereon at opposite ends cooperating with said grooved ring in holding the assembled parts together as a unit 3. A unit-structure ball and roller bearing comprising concentric rings having confronting bearing surfaces, rollers arranged in concentric rows between said rings, and a row of balls between said rows of rollers, each ball separating adjacent pairs of rollers, the bearing surface of the outer ring having annular parallel grooves therein providing a race-way for one row of rollers at each side of its center, and an intermediate raceway for said row of balls, the inner ring having means thereon at opposite ends cooperating with the grooved outer ring in holding the assembled parts together, said means enabling the inner ring to be withdrawn, thereby permitting the bearing to fall apart.

4. A unit-structure bearing comprising concentric rings, rows of rollers between said rings, and a row of balls between said rows of rollers, the individual balls being arranged between and holding apart adjacent pairs of rollers, the outer ring having on the inner side thereof a series of annular grooves, providing race-ways for said rollers and balls, the inner ring having means thereon at opposite ends coöperating with said outer ring in holding the assembled parts together, said means enabling the inner ring to be withdrawn, thereby permitting the bearing to fall apart.

5. A unit-structure ball and roller bearing comprising concentric rings, rollers arranged in concentric rows between said rings, and a row of balls between said rows of rollers, the individual balls being arranged between and holding apart adjacent pairs of rollers, the outer ring having on the inner side thereof a series of annular grooves, providing raceways for said rollers and balls, and the outer surface or periphery of the inner ring being smooth and having means thereon coöperating with the internally grooved outer ring in holding the assembled parts together.

6. A unit-structure ball and roller bearing comprising concentric rings with rollers arranged in concentric rows between said rings, one row at each side thereof, and a row of balls between said rows of rollers, the individual balls being arranged between and holding apart adjacent pairs of rollers, the outer ring having on the inner side thereof a series of annular grooves, providing raceways for said rollers and balls, and the outer face or periphery of the inner ring being smooth and having a flange at one end and means at the other end thereof against which the rollers abut to prevent endwise movement, the assembled parts being held together by the coöperative action of the two rings with provision for withdrawing one ring and thereby permitting the bearing to fall apart.

7. A unit-structure ball and roller bearing comprising concentric rings and concentric rows of balls and rollers between the rings, there being a row of balls between rows of rollers, the balls separating adjacent pairs of rollers, and the inner ring having an annular flange at one end and a slightly raised portion at the other end thereof to permit insertion by pressure endwise through the opening encircled by said rows of rollers and balls, and prevent endwise movement after forcibly inserting the same.

8. A unit-structure ball and roller bearing comprising concentric rings and interposed rows of rollers and balls, the outer ring having on the inner side thereof near each edge or margin an annular groove having a substantially flat bearing surface, and an annular concave groove between said marginal grooves, the inner ring being exteriorly flanged at one end and having means at the other end thereof, for confining the ring in the opening encircled by the rollers and balls, the assembled parts being held together by the coöperative action of the two rings, one of which is removable endwise for taking the bearing apart.

9. A unit-structure bearing comprising outer and inner rings whose confronting bearing surfaces present, on one ring, a series of annular grooves providing raceways for rollers and balls, and on the other ring a smooth surface, a plurality of annular series of rollers between said rings having independently revoluble axial connections, and an annular series of balls arranged between two annular series of rollers and the individual balls arranged between and separating two adjacent pairs of rollers by contact with said axial connections.

10. A unit-structure bearing comprising concentric rings and rows of rollers and balls between, the outer ring having raceways for said rollers and balls on the inner side thereof consisting of annular grooves having substantially flat bottoms and separated by a concave annular groove, and the inner ring having a smooth exterior bearing surface with a flange at one end and means at the other end thereof, for confining the ring in the opening encircled by the rollers and balls, the two rings serving to hold the assembled parts together, and said means permitting the removal of the inner ring for taking the bearing apart.

11. A ball and roller bearing comprising cylindrical bearing members and rows of balls and rollers between said members, the outer member having a series of annular grooves on the inner side thereof, a row of balls in one of said annular grooves and a row of rollers at each side of said row of balls in each of the outer or marginal annular grooves; the bottoms of the latter grooves being flat to receive the peripheries of the rollers, and the inner bearing member having a smooth exterior and means thereon to prevent separation of the parts by its accidental withdrawal from between the rows of balls and rollers in handling the device, said means rendering the inner ring removable for taking the bearing apart.

In testimony whereof I affix my signature, in presence of two witnesses.

HENRY B. KEIPER.

Witnesses:
LOLA VAN GIESON,
CHAS. E. LONG.